US012621682B2

(12) United States Patent
Alasti et al.

(10) Patent No.: US 12,621,682 B2
(45) Date of Patent: May 5, 2026

(54) SYSTEM FOR ADDRESSING INCOMPATIBILITIES AMONG A PLURALITY OF COMPONENTS OF AN OPEN RADIO NETWORK (O-RAN)

(71) Applicant: Boost SubscriberCo L.L.C., Englewood, CO (US)

(72) Inventors: Mehdi Alasti, Arlington, VA (US); Sourabh Gupta, Ashburn, VA (US); Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 314 days.

(21) Appl. No.: 18/399,513

(22) Filed: Dec. 28, 2023

(65) Prior Publication Data

US 2025/0220524 A1 Jul. 3, 2025

(51) Int. Cl.
*H04W 24/02* (2009.01)
*H04L 41/085* (2022.01)

(52) U.S. Cl.
CPC ........... *H04W 24/02* (2013.01); *H04L 41/085* (2013.01)

(58) Field of Classification Search
CPC ... H04L 41/08; H04L 41/085; H04L 41/0853; H04L 41/0866; H04L 41/0869; H04L 41/0873; H04W 24/02; H04W 24/08
See application file for complete search history.

(56) References Cited

U.S. PATENT DOCUMENTS

| | | | |
|---|---|---|---|
| 9,471,462 B2 | 10/2016 | Butler et al. | |
| 10,484,242 B2 | 11/2019 | Chauhan et al. | |
| 11,039,383 B2 | 6/2021 | Mukherjee et al. | |
| 2023/0045847 A1 | 2/2023 | Wong et al. | |
| 2024/0107592 A1* | 3/2024 | Liu | H04W 24/08 |
| 2024/0298195 A1* | 9/2024 | Shabah | H04W 24/02 |
| 2025/0184817 A1* | 6/2025 | Ito | H04W 92/04 |

OTHER PUBLICATIONS

International Search Report and Written Opinion in International Appln. No. PCT/US2024/062084, mailed on Apr. 14, 2025, 14 pages.

* cited by examiner

*Primary Examiner* — Pao Sinkantarakorn

(74) *Attorney, Agent, or Firm* — Fish & Richardson P.C.

(57) ABSTRACT

A method of addressing incompatibilities among a plurality of components of an open radio access network (O-RAN) includes receiving, from a provider associated with at least one component of the plurality of components, configuration information associated with the component, transmitting, to one or more computing devices of a plurality of providers associated with corresponding ones of the plurality of components, a list of information elements (IEs) that is (i) generated based on the configuration information and (ii) configured to receive corresponding IEs from the one or more computing devices of the plurality of providers, the corresponding IEs comprising information related to operational parameters or functionalities of the respective components associated with each provider, receiving, in response to the list, responses indicative of support for operational parameters or functionalities, and identifying, based on responses, one or more incompatibilities among the plurality of components of the O-RAN.

18 Claims, 4 Drawing Sheets

Receiving configuration
information
210

Transmitting a list of IEs
220

Receiving a plurality of
responses
230

Identifying one or more
incompatibilities
240

Transmitting information
indicative of the one or
more incompatibilities
250

Receiving information
indicative of the one or
more incompatibilities
being addressed
260

Performing an
interoperability test
270

Figure 3:
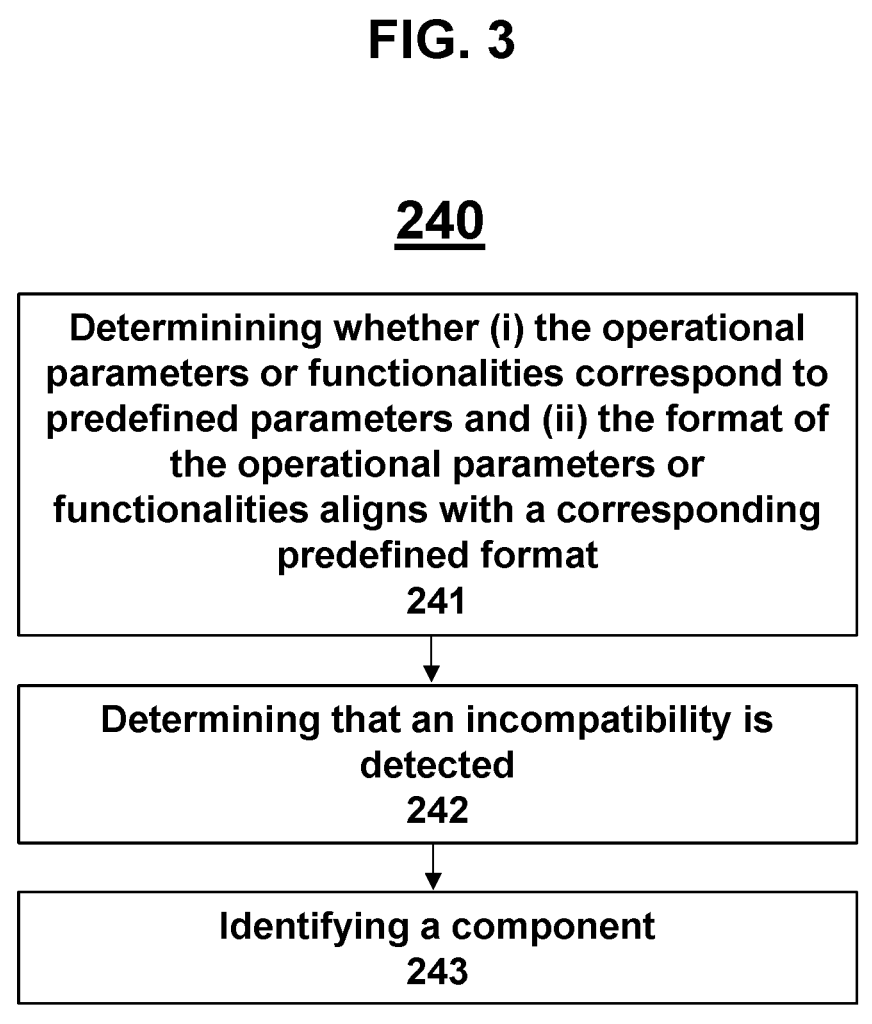

Determinining whether (i) the operational parameters or functionalities correspond to predefined parameters and (ii) the format of the operational parameters or functionalities aligns with a corresponding predefined format
241

Determining that an incompatibility is detected
242

Identifying a component
243

SYSTEM FOR ADDRESSING INCOMPATIBILITIES AMONG A PLURALITY OF COMPONENTS OF AN OPEN RADIO NETWORK (O-RAN)

TECHNICAL FIELD

The present disclosure relates to a system operating in an open radio network (O-RAN), and more particularly, a method of addressing incompatibilities among a plurality of components of the O-RAN.

BACKGROUND

Interoperability testing for O-RAN (Open Radio Access Network) is a process of evaluating and ensuring the compatibility and seamless communication between different components, elements, or devices within an O-RAN ecosystem. O-RAN is an architecture for designing and implementing open, standardized, and interoperable radio access networks.

SUMMARY

The present disclosure is directed to addressing incompatibilities among a plurality of components of an open radio access network (O-RAN).

According to one aspect of the subject matter described in this application, a method of addressing incompatibilities among a plurality of components of an O-RAN can include receiving, from a provider associated with at least one component of the plurality of components, configuration information associated with the component, transmitting, to one or more computing devices of a plurality of providers associated with corresponding ones of the plurality of components, a list of information elements (IEs) that is (i) generated based on the configuration information and (ii) configured to receive corresponding IEs from the one or more computing devices of the plurality of providers, the corresponding IEs comprising information related to operational parameters or functionalities of the respective components associated with each provider, receiving, from the one or more computing devices of the plurality of providers, in response to transmitting the list, a plurality of responses indicative of support for operational parameters or functionalities, identifying, based on the plurality of responses, one or more incompatibilities among the plurality of components of the O-RAN, transmitting, to the one or more computing devices of the plurality of providers, information indicative of the one or more incompatibilities, receiving, from the one or more computing devices of the plurality of providers, information indicative of the one or more incompatibilities being addressed, and responsive to receiving the information indicative of the one or more incompatibilities being addressed, performing an interoperability test that evaluates compatibilities between the plurality of components of the O-RAN.

Implementations according to this aspect can include one or more of the following features. For example, the configuration information can include information related to different network conditions and interaction within the O-RAN.

In some implementations, the IEs can be associated with operational parameters or functionalities based on the configuration information. In some examples, the IEs can include at least one of a configuration parameter, a measurement report, a handover parameter, a control message, identity and synchronization information, security and authentication data, and a quality-of-service parameter.

In some examples, the corresponding IEs can indicate whether (i) the operational parameters or functionalities are supported and (ii) a format of each of the operational parameters or functionalities. In some examples, each of the plurality of responses can include the corresponding IEs indicating whether the operational parameters or functionalities are supported and the format of each of the operational parameters or functionalities.

In some implementations, identifying the one or more incompatibilities can include, for each response of the plurality of responses, determining whether (i) the operational parameters or functionalities correspond to predefined one or more parameters associated with the configuration information and (ii) the format of each of the one or more operational parameters or functionalities aligns with a corresponding predefined format associated with the configuration information, based on a determination that either (i) the operational parameters or functionalities or (ii) the format does not align with the corresponding predefined parameters or format, determining that an incompatibility is detected for a current response among the plurality of responses, and identifying a component associated with the current response as a source of incompatibility.

In some examples, the plurality of components can include a remote radio unit (RRU), a radio unit (RU), a distributed unit (DU), and a centralized unit (CU). In some examples, transmitting the information indicative of the one or more incompatibilities can include transmitting information regarding the identified one or more incompatibilities and instructions to address the identified one or more incompatibilities.

According to another aspect of the subject matter described in this application, a system for addressing incompatibilities among a plurality of components of an open radio access network (O-RAN) can include at least one processor, and memory coupled to the at least one processor and storing instructions that, based on being executed by the at least one processor, perform operations. The operation can include receiving, from a provider associated with at least one component of the plurality of components, configuration information associated with the component, transmitting, to one or more computing devices of a plurality of providers associated with corresponding ones of the plurality of components, a list of information elements (IEs) that is (i) generated based on the configuration information and (ii) configured to receive corresponding IEs from the one or more computing devices of the plurality of providers, the corresponding IEs comprising information related to operational parameters or functionalities of the respective components associated with each provider, receiving, from the one or more computing devices of the plurality of providers, in response to transmitting the list, a plurality of responses indicative of support for operational parameters or functionalities, identifying, based on the plurality of responses, one or more incompatibilities among the plurality of components of the O-RAN, transmitting, to the one or more computing devices of the plurality of providers, information indicative of the one or more incompatibilities, receiving, from the one or more computing devices of the plurality of providers, information indicative of the one or more incompatibilities being addressed, and responsive to receiving the information indicative of the one or more incompatibilities being addressed, performing an interoperability test that evaluates compatibilities between the plurality of components of the O-RAN.

Implementations according to this aspect can include one or more of the following features. For example, the configuration information can include information related to different network conditions and interaction within the O-RAN.

In some implementations, the IEs can be associated with operational parameters or functionalities based on the configuration information. In some examples, the IEs can include at least one of a configuration parameter, a measurement report, a handover parameter, a control message, identity and synchronization information, security and authentication data, and a quality-of-service parameter.

In some examples, the corresponding IEs can indicate whether (i) the operational parameters or functionalities are supported and (ii) a format of each of the operational parameters or functionalities. In some examples, each of the plurality of responses can include the corresponding IEs indicating whether the operational parameters or functionalities are supported and the format of each of the operational parameters or functionalities.

In some implementations, identifying the one or more incompatibilities can include, for each response of the plurality of responses, determining whether (i) the operational parameters or functionalities correspond to predefined one or more parameters associated with the configuration information and (ii) the format of each of the one or more operational parameters or functionalities aligns with a corresponding predefined format associated with the configuration information, based on a determination that either (i) the operational parameters or functionalities or (ii) the format does not align with the corresponding predefined parameters or format, determining that an incompatibility is detected for a current response among the plurality of responses, and identifying a component associated with the current response as a source of incompatibility.

In some examples, the plurality of components can include a remote radio unit (RRU), a radio unit (RU), a distributed unit (DU), and a centralized unit (CU). In some examples, transmitting the information indicative of the one or more incompatibilities can include transmitting information regarding the identified one or more incompatibilities and instructions to address the identified one or more incompatibilities.

BRIEF DESCRIPTION OF THE DRAWINGS

FIG. 1 is a diagram illustrating an example of an open radio access network (O-RAN).

FIG. 3 is a flowchart showing an exemplary component incompatibilities identification process.

DETAILED DESCRIPTION

Figure 2:
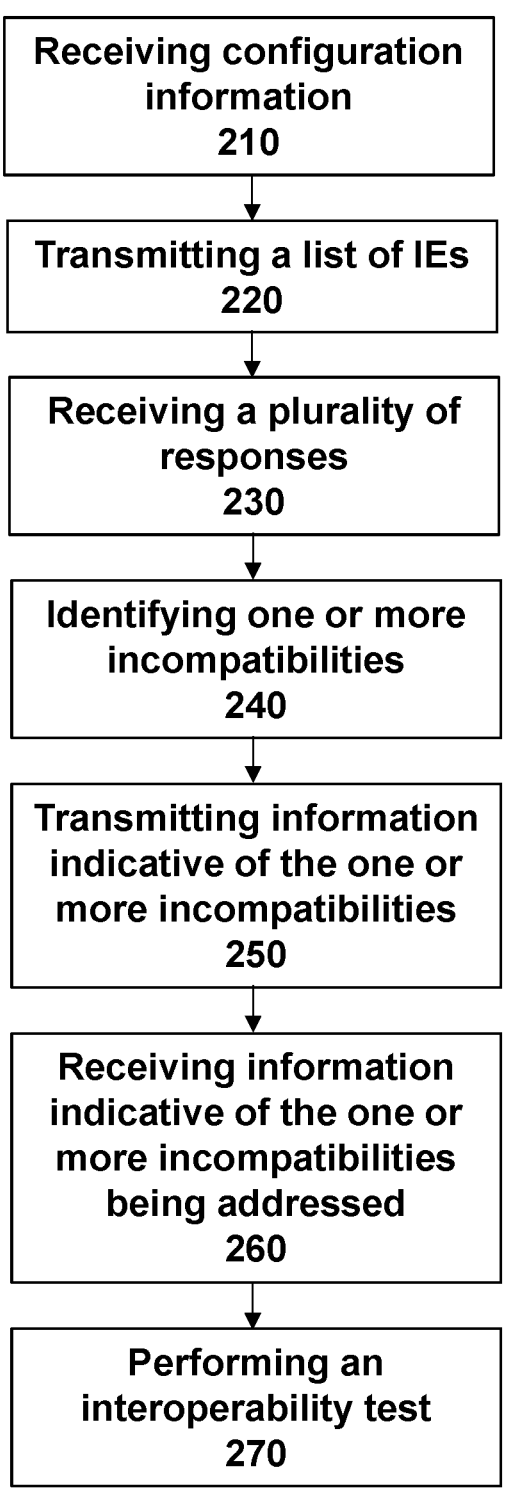
FIG. 2 is a flowchart showing an exemplary process for addressing component incompatibilities.

IoT for O-RANs requires an alignment process, which includes ensuring that diverse elements, such as radio units, baseband units & distributed units, and central units from various manufacturers, can work together cohesively and effectively. However, such process can be significantly time-consuming, often leading to operators and vendors discovering misalignments during the IoT testing phase itself. Further, the testing procedure typically identifies one misaligned Information Element (IE), which refers to a specific piece of data or a parameter within a communication or protocol, at a time, necessitating multiple iterations to uncover further misalignments, thus prolonging the overall process.

The present disclosure is directed to a platform that automates the identification of potential misalignments in IEs and IE formats before commencing IoT testing. By preemptively identifying misalignments in IEs, the technology described herein allows for a comprehensive understanding of misaligned IEs and configurations pertinent to corresponding intended use cases, thereby allowing vendors to address and rectify these issues before commencing IoT testing, substantially reducing both the time and costs associated with O-RAN component IoT testing.

Figure 1:
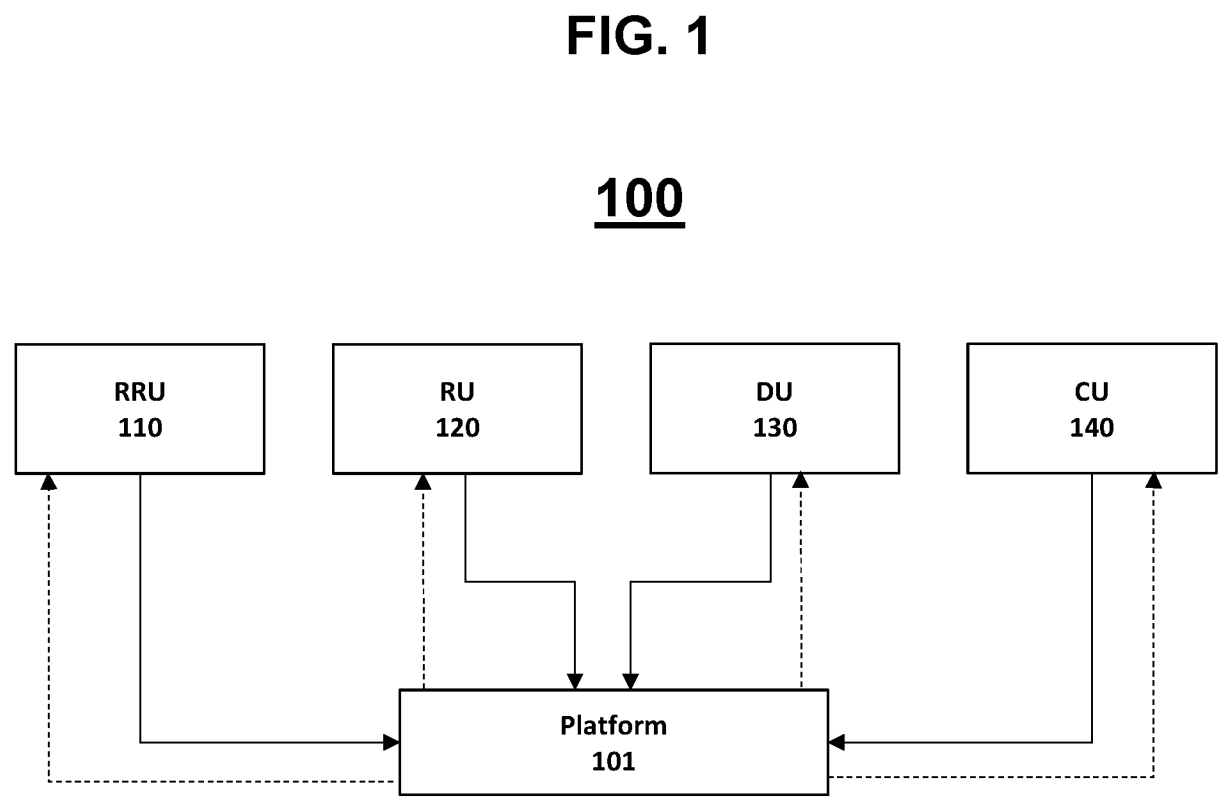

FIG. 1 is a diagram illustrating an example of an open radio access network (O-RAN) 100. Referring to FIG. 1, the O-RAN 100 can include an automatic configuration alignment platform 101, a remote radio unit (RRU) 110, a radio unit (RU) 120, a distributed unit (DU) 130, and a centralized unit (CU) 140.

The architecture of the O-RAN 100 can be designed to be open, flexible, and interoperable. For example, components of the O-RAN can include the RRU 110, the RU 120, the DU 130, and the CU 140 each associated with a component provider of the O-RAN 100. These components can work together to enable interoperability in the O-RAN framework.

The RRU 110 can perform radio frequency (RF) and antenna-related tasks. The RU 120 can perform the radio transmission and reception, handle the analog RF functions, such as modulation and amplification, and convert digital signals to RF for transmission. The DU 130 can process digital baseband signals and perform functions like channel coding, modulation, and beamforming. In some implementations, the DU 130 can be implemented as software-based solutions, providing flexibility in network deployment. The CU 140 can refer to a central processing unit configured to handle the overall coordination and control of the RAN. In some implementations, the CU 140 can manage multiple DUs and orchestrates resources for efficient network operation.

Each of the RRU 110, the RU 120, the DU 130, and the CU 140 can include one or more processors to perform above-noted operations. In some implementations, each of the RRU 110, the RU 120, the DU 130, and the CU 140 can include one or more transceivers to transmit and receive signals.

For example, the RRU 110, the RU 120, the DU 130, and the CU 140 can transmit, to the platform 101, configuration information associated with the component, where the configuration information includes information related to different network conditions and interaction within the O-RAN. In some implementations, at least one of the RRU 110, the RU 120, the DU 130, or the CU 140 can generate the configuration information for specific use cases for assessing compatibility, protocol adherence, and performance to ensure smooth communication and functionality within the O-RAN framework.

For example, if an operator associated with the RRU 110, the RU 120, the DU 130, or the CU 140 intends to support URLLC service for a robotic use case with a target performance, specific features and capabilities (e.g., uplink configured free transmission, etc) and configuration parameters at the RU, the DU and the CU may be necessary at the RU, the DU, and the CU.

As another example, various types of handovers supported by 5G, such as regular handover, DAPS, Conditional handover, and Rel-18 enhanced handover, may necessitate specific features and capabilities. Additionally, the implementation of new AI/ML (analytics) supported by recent 3GPP releases also requires specific features and capabilities.

The platform 101 can receive, from at least one of the RRU 110, the RU 120, the DU 130, or the CU 140, the configuration information and generate a list of information elements (IEs) that is (i) based on the configuration information and (ii) configured to receive corresponding IEs from the one or more computing devices of the plurality of providers. In some implementations, the corresponding IEs can include information related to operational parameters or functionalities of the respective components associated with each provider.

For example, the IEs included in the list can be associated with operational parameters or functionalities based on the configuration information. The IEs can include specific pieces of information or parameters that are exchanged between different network elements to ensure compatibility and seamless communication within the O-RAN framework. These IEs can be used to verify that different components from various providers can understand and interpret the exchanged information correctly. In some implementations, the IEs may vary based on the O-RAN specifications and the specific aspects being tested.

For example, the IEs can include a cell configuration information IE, a radio resource management IE, a handover and mobility IE, a security mobility IE, a quality of service (QOS) IE, a management and control IE, a vendor-specific IE, and a user equipment (UE) capability IE.

The cell configuration information IE can include parameters related to the configuration of individual cells within the RAN, such as frequency bands, bandwidth, cell identity, etc. The radio resource management IE can include information related to the allocation and management of radio resources, including parameters like power control, modulation schemes, and scheduling information. The handover and mobility IE can include parameters that facilitate smooth handovers between different cells or base stations, ensuring seamless mobility for connected devices. The security IE can include information related to security protocols, authentication, encryption, and other security measures to ensure the confidentiality and integrity of communications. The QOS IE can include parameters specifying the desired quality of service for data transmission, including factors like data rate, latency, and reliability. The management and control IE can include information elements that support management and control functions within the network, such as configuration updates, software updates, and fault management. The vendor-specific IE can include IEs that are unique to a particular provider's implementation. The UE capability IOE can include information related to the capabilities of user equipment, ensuring that the network can adapt its configuration based on the capabilities of connected devices.

The specific IEs used in O-RAN will depend on the features being tested according to the configuration information and the O-RAN specifications being followed. For example, if the configuration information is related to a specific scenario for resource allocation, the list of IEs may include a radio resource management IE and an input field for the provider to indicate whether the radio resource management IE is supported and whether the format of the radio resource management IE is supported by the component associated with the provider. In some implementations, the resource allocation can be associated with uplink configured-grant resources for URLLC/industrial-IoT/robotic scenarios.

In some implementations, the list of IEs can be configured to receive corresponding IEs from the one or more computing devices of the plurality of providers. For example, the list of IEs can include input fields for receiving corresponding IEs. This enables the provider to input information indicating whether the component associated with the provider supports the IE and the format of the IE. In some implementations, the information can indicate one or more operational parameters or functionalities supported by the component.

The platform 101 can receive, from the one or more computing devices of the plurality of providers (e.g., the RRU 110, the RU 120, the DU 130, and the CU 140), in response to transmitting the list, a plurality of responses indicative of support for operational parameters or functionalities.

For example, the RRU 110, the RU 120, the DU 130, and the CU 140 can transmit, in response to the list of IEs received from the platform 101, a plurality of responses indicating whether the corresponding component supports (i) the operational parameters or functionalities are supported and (ii) a format of each of the operational parameters or functionalities to the platform 101.

In some implementations, the platform 101 can identify, based on the plurality of responses, one or more incompatibilities among the plurality of components of the O-RAN 100. For example, the platform 101 can, for each response of the plurality of responses, determine whether (i) the operational parameters or functionalities correspond to predefined one or more parameters associated with the configuration information and (ii) the format of each of the one or more operational parameters or functionalities aligns with a corresponding predefined format associated with the configuration information. Based on a determination that either (i) the operational parameters or functionalities or (ii) the format does not align with the corresponding predefined parameters or format, the platform 101 can determine that an incompatibility is detected for a current response among the plurality of responses, and identify a component associated with the current response as a source of incompatibility.

Based on the identification of the component, the platform 101 can transmit, to the one or more computing devices of the plurality of providers, information indicative of the one or more incompatibilities. For example, the platform 101 can transmit information regarding the identified one or more incompatibilities and instructions to address the identified one or more incompatibilities.

In some implementations, the platform 101 can receive, from the one or more computing devices of the plurality of providers, information indicative of the one or more incompatibilities being addressed.

Responsive to receiving the information indicative of the one or more incompatibilities being addressed, the platform 101 can perform an interoperability test that evaluates compatibilities between the plurality of components of the O-RAN.

FIG. 2 is flowchart showing an exemplary process 200 for addressing component incompatibilities.

In step 210, the platform 101 can receive, from a provider associated with at least one component of the plurality of components (the RRU 110, the RU 120, the DU 130, and the CU 140), configuration information associated with the component.

For example, the configuration information includes information related to different network conditions and interaction within the O-RAN.

In step 220, the platform 101 can transmit, to one or more computing devices of a plurality of providers associated with corresponding ones of the plurality of components (the RRU 110, the RU 120, the DU 130, and the CU 140), a list of information elements (IEs) that is (i) generated based on the configuration information and (ii) configured to receive corresponding IEs from the one or more computing devices of the plurality of providers. In some implementations, the corresponding IEs can include information related to operational parameters or functionalities of the respective components associated with each provider.

In some implementations, the IEs included in the list are associated with operational parameters or functionalities based on the configuration information. For example, the IEs can include at least one of a configuration parameter, a measurement report, a handover parameter, a control message, identity and synchronization information, security and authentication data, and a quality-of-service parameter.

In step 230, the platform 101 can receive, from the one or more computing devices of the plurality of providers, in response to transmitting the list, a plurality of responses indicative of support for operational parameters or functionalities.

For example, the plurality of responses can indicate whether (i) the operational parameters or functionalities and (ii) formats of the operational parameters or functionalities are supported.

In step 240, the platform 101 can identify, based on the plurality of responses received in step 230, one or more incompatibilities among the plurality of components of the O-RAN. The detailed procedures for identifying the one or more incompatibilities among the plurality of components of the O-RAN are described with respect to FIG. 3.

In step 250, the platform 101 can transmit, to the one or more computing devices of the plurality of providers, information indicative of the one or more incompatibilities identified in step 240.

In some implementations, the platform 101 can transmit information regarding the identified one or more incompatibilities and instructions to address the identified one or more incompatibilities.

In step 260, the platform 101 can receive, from the one or more computing devices of the plurality of providers, information indicative of the one or more incompatibilities being addressed.

In step 270, responsive to receiving the information indicative of the one or more incompatibilities being addressed, an interoperability test that evaluates compatibilities between the plurality of components of the O-RAN can be performed.

FIG. 3 is flowchart showing an exemplary component incompatibilities identification process 240. The platform 101 can perform the steps 241, 242, and 243 for each response of the plurality of response received in step 230.

In step 241, the platform 101 can determine whether (i) the operational parameters or functionalities correspond to predefined one or more parameters associated with the configuration information and (ii) the format of each of the one or more operational parameters or functionalities aligns with a corresponding predefined format associated with the configuration information.

In step 242, based on a determination that either (i) the operational parameters or functionalities or (ii) the format does not align with the corresponding predefined parameters or format in step 241, the platform 101 can determine that an incompatibility is detected for a current response among the plurality of responses.

In step 243, the platform 101 can identify a component associated with the current response as a source of incompatibility.

Figure 4:
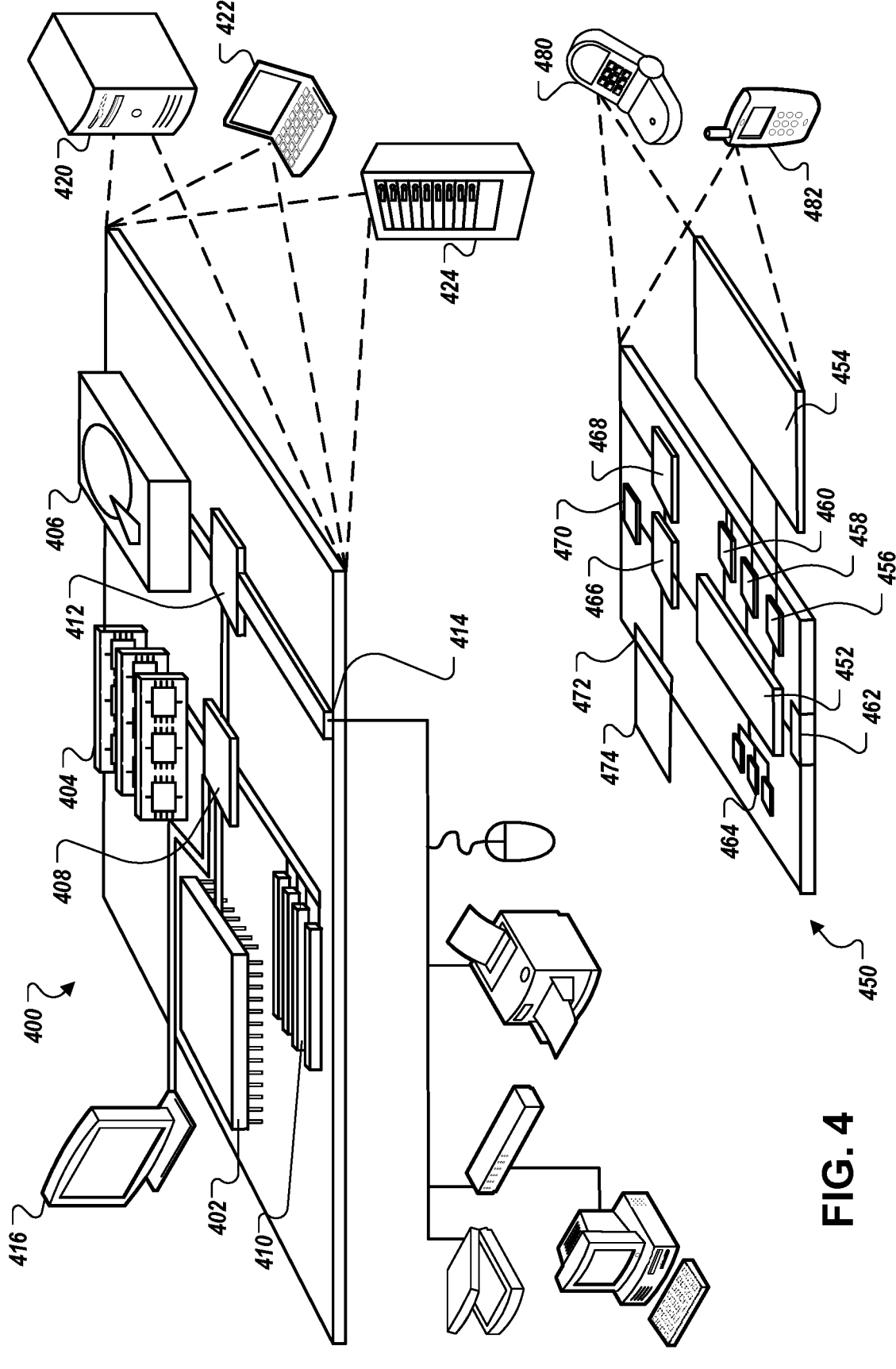
FIG. 4 is a diagram illustrating a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other. The computing device 400 may be implemented in the platform 101, the RRU 110, the RU 120, the DU 130, and the CU 140 described with respect to FIGS. 1-3.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the RRU 110, the RU 120, the DU 130, and the CU 140 described with respect to FIGS. 1-3. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A method of addressing incompatibilities among a plurality of components of an open radio access network (O-RAN), the method comprising:

receiving, from a provider associated with at least one component of the plurality of components, configuration information associated with the component;

transmitting, to one or more computing devices of a plurality of providers associated with corresponding ones of the plurality of components, a list of information elements (IEs) that is (i) generated based on the configuration information and (ii) configured to receive corresponding IEs from the one or more computing devices of the plurality of providers, the corresponding IEs comprising information related to operational parameters or functionalities of the respective components associated with each provider;

receiving, from the one or more computing devices of the plurality of providers, in response to transmitting the list, a plurality of responses indicative of support for operational parameters or functionalities;

identifying, based on the plurality of responses, one or more incompatibilities among the plurality of components of the O-RAN;

transmitting, to the one or more computing devices of the plurality of providers, information indicative of the one or more incompatibilities;

receiving, from the one or more computing devices of the plurality of providers, information indicative of the one or more incompatibilities being addressed; and responsive to receiving the information indicative of the one or more incompatibilities being addressed, performing an interoperability test that evaluates compatibilities between the plurality of components of the O-RAN.

2. The method of claim 1, wherein the configuration information includes information related to different network conditions and interaction within the O-RAN.

3. The method of claim 1, wherein the IEs in the list are associated with operational parameters or functionalities based on the configuration information.

4. The method of claim 3, wherein the IEs in the list include at least one of a configuration parameter, a measurement report, a handover parameter, a control message, identity and synchronization information, security and authentication data, and a quality-of-service parameter.

5. The method of claim 3, wherein the corresponding IEs indicate whether (i) the operational parameters or functionalities are supported and (ii) a format of each of the operational parameters or functionalities.

6. The method of claim 5, wherein each of the plurality of responses includes the corresponding IEs indicating whether the operational parameters or functionalities are supported and the format of each of the operational parameters or functionalities.

7. The method of claim 6, wherein identifying the one or more incompatibilities includes:

for each response of the plurality of responses:

determining whether (i) the operational parameters or functionalities correspond to predefined one or more parameters associated with the configuration information and (ii) the format of each of the one or more operational parameters or functionalities aligns with a corresponding predefined format associated with the configuration information, based on a determination that either (i) the operational parameters or functionalities or (ii) the format does not align with the corresponding predefined parameters or format, determining that an incompatibility is detected for a current response among the plurality of responses, and identifying a component associated with the current response as a source of incompatibility.

8. The method of claim 1, wherein the plurality of components include a remote radio unit (RRU), a radio unit (RU), a distributed unit (DU), and a centralized unit (CU).

9. The method of claim 1, wherein transmitting the information indicative of the one or more incompatibilities comprises transmitting, to the one or more computing devices of the plurality of providers, information regarding the identified one or more incompatibilities and instructions to address the identified one or more incompatibilities.

10. A system for addressing incompatibilities among a plurality of components of an open radio access network (O-RAN), the system comprising:

at least one processor; and memory coupled to the at least one processor and storing instructions that, based on being executed by the at least one processor, perform operations comprising:

receiving, from a provider associated with at least one component of the plurality of components, configuration information associated with the component;

transmitting, to one or more computing devices of a plurality of providers associated with corresponding ones of the plurality of components, a list of information elements (IEs) that is (i) generated based on the configuration information and (ii) configured to receive corresponding IEs from the one or more computing devices of the plurality of providers, the corresponding IEs comprising information related to operational parameters or functionalities of the respective components associated with each provider;

receiving, from the one or more computing devices of the plurality of providers, in response to transmitting the list, a plurality of responses indicative of support for operational parameters or functionalities;

identifying, based on the plurality of responses, one or more incompatibilities among the plurality of components of the O-RAN;

transmitting, to the one or more computing devices of the plurality of providers, information indicative of the one or more incompatibilities;

receiving, from the one or more computing devices of the plurality of providers, information indicative of the one or more incompatibilities being addressed; and responsive to receiving the information indicative of the one or more incompatibilities being addressed, performing an interoperability test that evaluates compatibilities between the plurality of components of the O-RAN.

11. The system of claim 10, wherein the configuration information includes information related to different network conditions and interaction within the O-RAN.

12. The system of claim 10, wherein the IEs in the list are associated with operational parameters or functionalities based on the configuration information.

13. The system of claim 12, wherein the IEs in the list include at least one of a configuration parameter, a measurement report, a handover parameter, a control message, identity and synchronization information, security and authentication data, and a quality-of-service parameter.

14. The system of claim 12, wherein the corresponding IEs indicate whether (i) the operational parameters or functionalities are supported and (ii) a format of each of the operational parameters or functionalities.

15. The system of claim 14, wherein each of the plurality of responses includes the corresponding IEs indicating whether the operational parameters or functionalities are supported and the format of each of the operational parameters or functionalities.

16. The system of claim 15, wherein identifying the one or more incompatibilities includes:

for each response of the plurality of responses:

determining whether (i) the operational parameters or functionalities correspond to predefined one or more parameters associated with the configuration information and (ii) the format of each of the one or more operational parameters or functionalities aligns with a corresponding predefined format associated with the configuration information, based on a determination that either (i) the operational parameters or functionalities or (ii) the format does not align with the corresponding predefined parameters or format, determining that an incompatibility is detected for a current response among the plurality of responses, and identifying a component associated with the current response as a source of incompatibility.

17. The system of claim 10, wherein the plurality of components include a remote radio unit (RRU), a radio unit (RU), a distributed unit (DU), and a centralized unit (CU).

18. The system of claim 10, wherein transmitting the information indicative of the one or more incompatibilities comprises transmitting, to the one or more computing devices of the plurality of providers, information regarding the identified one or more incompatibilities and instructions to address the identified one or more incompatibilities.

\* \* \* \* \*